(12) United States Patent
Haynes

(10) Patent No.: US 6,879,282 B2
(45) Date of Patent: Apr. 12, 2005

(54) GUIDED WAVE RADAR LEVEL TRANSMITTER

(75) Inventor: Kevin M. Haynes, Lombard, IL (US)

(73) Assignee: Magnetrol International Incorporated, Downers Grove, IL (US)

( * ) Notice: Subject to any disclaimer, the term of this patent is extended or adjusted under 35 U.S.C. 154(b) by 0 days.

(21) Appl. No.: 10/794,142

(22) Filed: Mar. 5, 2004

(65) Prior Publication Data

US 2004/0169601 A1 Sep. 2, 2004

Related U.S. Application Data

(62) Division of application No. 10/642,257, filed on Aug. 15, 2003, now Pat. No. 6,801,157.
(60) Provisional application No. 60/415,489, filed on Oct. 2, 2002.

(51) Int. Cl.[7] .............................................. G01S 13/08
(52) U.S. Cl. ...................................... 342/124; 342/145
(58) Field of Search ................................. 342/124, 145, 342/198; 73/290 V, 290 R; 340/621, 624; 324/124, 629, 644; 367/189, 908

(56) References Cited

U.S. PATENT DOCUMENTS

| | | | |
|---|---|---|---|
| 4,984,449 A | * | 1/1991 | Caldwell et al. .............. 73/49.2 |
| 5,233,352 A | | 8/1993 | Cournane |
| 5,596,325 A | | 1/1997 | Maas |
| 5,609,059 A | | 3/1997 | McEwan |
| 5,973,637 A | | 10/1999 | Perdue et al. |
| 6,137,438 A | | 10/2000 | McEwan |
| 6,249,244 B1 | | 6/2001 | Heidecke |
| 6,320,532 B1 | | 11/2001 | Diede |
| 6,559,657 B1 | * | 5/2003 | McCarthy et al. ........... 324/642 |
| 2001/0050629 A1 | * | 12/2001 | Benway et al. .............. 342/124 |

OTHER PUBLICATIONS

DKE Deutsche Kommission Elektrotechnik Electronik Informationstechnik im DIN und VDE, "Electrical apparatus for potentially explosive atomospheres—Intrinsic safety" European Standard EN 50020, "Standard for Intrinsic Safety", 1994, pp. 22 and 25–27.

* cited by examiner

Primary Examiner—Thomas H. Tarcza
Assistant Examiner—Isam Alsomiri
(74) Attorney, Agent, or Firm—Wood, Phillips, Katz, Clark & Mortimer

(57) ABSTRACT

A guided wave radar measurement instrument comprises a probe defining a guided wave radar transmission line. A pulse circuit is connected to the probe for generating a very fast stream of pulses on the transmission line and receiving reflected pulses returned on the transmission line. The reflected pulses represent a characteristic of a material being measured. An equivalent time sampling circuit is connected to the pulse circuit operable to sample reflected pulses to build a time multiplied picture of the reflected pulses and comprises a ramp generator circuit generating a saw tooth ramp signal used to selectively delay sampling reflected pulses to build the time multiplied picture. In one aspect of the instrument, the saw tooth ramp signal has a controlled ramp start for each cycle and retrace at an end of the cycle. A processing circuit is connected to the equivalent time sampling circuit for selectively controlling ramp start for each cycle and measuring round trip travel time for a pulse from the pulse circuit.

15 Claims, 9 Drawing Sheets

GUIDED WAVE RADAR LEVEL TRANSMITTER

CROSS REFERENCE TO RELATED APPLICATION

Divisional of prior application Ser. No. 10/642,257, filed Aug. 15, 2003 U.S. Pat. No. 6,801,157.

This application claims priority of Provisional Application No. 60/415,489, filed Oct. 2, 2002.

FIELD OF THE INVENTION

This invention relates to an apparatus utilizing guided wave radar for measuring the condition or characteristics of a material, and more particularly to improvements in level measurement.

BACKGROUND OF THE INVENTION

Knowledge of level in industrial process tanks or vessels has long been required for safe and cost-effective operation of plants. Many technologies exist for making level measurements. These include buoyancy, capacitance, ultrasonic and microwave radar, to name a few. Recent advantages in pulsed radar, also known as ultra-wide band (UWB) radar, in conjunction with advances in equivalent time sampling (ETS), permit development of low power and low cost time domain reflectometry (TDR) devices.

In a TDR instrument, a very fast stream of pulse with a rise time of 500 picoseconds, or less, is propagated down a transmission line that serves as a probe in a vessel. The pulses are reflected by a discontinuity caused by a change in impedance, such as at a transition between two media. For level measurement, that transition is typically where the air and the material to be measured meet. Alternatively, the transition could be two different liquids. The amplitude of the reflected signal depends on the difference between the dielectrics of the two media. The dielectric of air is one, while the dielectric of water is about eighty. The larger the difference in dielectric, the larger the reflected signal.

Guided wave radar is one technique available to measure the level of liquids or solids in an industrial environment using TDR principles. Guided wave radar works by generating a stream of pulses of electromagnetic energy and propagating the pulses down a transmission line formed into a level sensing probe. The probe is generally placed vertically in a tank or other container and the electromagnetic pulse is launched downward from the top of the probe. The probe is open to both the air and the material to be sensed in such a way that the electromagnetic fields of the propagating pulse penetrate the air until they reach the level of the material. At that point, the electromagnetic fields see the higher dielectric of the material. This higher dielectric causes a reduction in the impedance of the transmission line, resulting in a pulse echo being reflected back to the top of the probe. The pulse travels through the air dielectric portion of the probe at a known velocity. This allows the material level on the probe to be determined by measuring the round trip travel time of the pulse from the top of the probe to the level and back to the top of the probe. Conductive materials generate echoes similar to the echoes from high dielectric materials. Therefore, the same measurement technique also works with conductive materials.

Guided wave radar level measuring instruments may use time domain reflectometry for determining level. These instruments use both electrical and electronic circuits to determine level. Some such instruments use complex circuits for implementing the TDR techniques. The complexity of the circuits may require additional components increasing the costs of the resulting devices.

The present invention is directed to overcoming one or more of the problems discussed above, in a novel and simple manner.

SUMMARY OF THE INVENTION

In accordance with the invention there is provided an improved, relatively low cost guided wave radar measurement instrument.

There is disclosed in accordance with one aspect of the invention a process instrument comprising a housing and an active sensing element for sensing a characteristic of a process. The control circuit is disposed in the housing and is electrically connected to the active sensing element for measuring the sensed characteristic. A safety barrier comprises a blocking capacitor barrier electrically connected between the control circuit and the active sensing element.

The active sensing element may comprise a guided wave radar transmission line or a capacitance probe.

It is a feature of the invention that the blocking capacitor barrier comprises a plurality of series connected high voltage capacitors.

There is disclosed in accordance with another aspect of the invention a guided wave radar measurement instrument comprising a probe defining a guided wave radar transmission line. A pulse circuit is connected to the probe for generating a very fast stream of pulses on the transmission line and receiving reflected pulses returned on the transmission line. The reflected pulses represent a characteristic of a material being measured. An equivalent time sampling circuit is connected to the pulse circuit operable to sample reflected pulses to build a time multiplied picture of the reflected pulses and comprises a ramp generator circuit generating a saw tooth ramp signal used to selectively delay sampling reflected pulses to build the time multiplied picture. The saw tooth ramp signal has a controlled ramp start for each cycle and retrace at an end of the cycle. A processing circuit is connected to the equivalent time sampling circuit for selectively controlling ramp start for each cycle and measuring round trip travel time for a pulse from the pulse circuit.

It is a feature of the invention that the ramp generator circuit comprises a latching ramp comparator. The latching ramp comparator latches at the end of the cycle and is reset by the processing circuit to start the ramp for each cycle. The latching ramp comparator has an output coupled to a non-inverted input. The processing circuit resets the latching comparator by applying a low voltage to the non-inverted input.

It is another feature of the invention that the ramp generator circuit comprises a resistor network operatively controlled by the processing circuit for controlling slope of the saw tooth ramp signal.

There is disclosed in accordance with a further aspect of the invention a domain reflectometry measurement instrument comprising a probe and a pulse circuit connected to the probe for generating a very fast stream of pulses on the probe and receiving reflective pulses returned on their probe. The reflected pulses represent a characteristic of a material being measured. An equivalent time sampling circuit is connected to the pulse circuit operable to sample reflected pulses to build a time multiplied picture of the reflected pulses, comprising a ramp generator circuit generating a saw tooth ramp signal used to selectively delay sampling reflected pulses to build the time multiplied picture. The ramp generator circuit comprises a ramp comparator that latches at a start voltage during each cycle until receiving a start ramp signal and retraces to the start voltage at an end of the cycle. A processing circuit is connected to the equivalent time sampling circuit for selectively generating the start ramp signal for each cycle and measuring round trip travel time for a pulse from the pulse circuit.

Further features and advantages of the invention will be readily apparent from the specification and from the drawings.

DETAILED DESCRIPTION OF THE INVENTION

Figure 1:
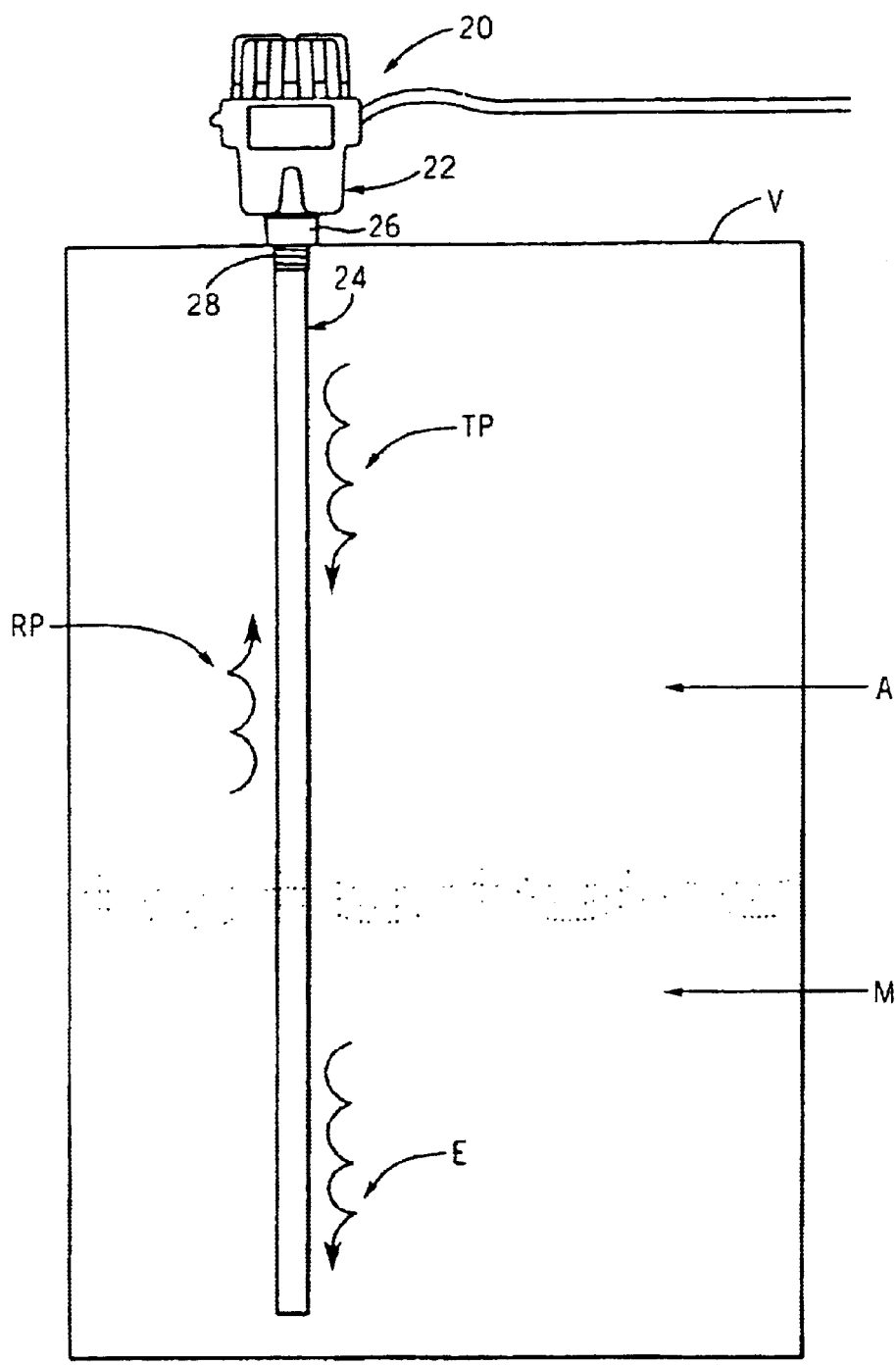
FIG. 1 is a side elevation view of a measurement instrument in accordance with the invention.

Referring to FIG. 1, a process instrument 20 according to the invention is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is typically mounted to a process vessel V using a threaded fitting 28. Alternatively, a flange may be used. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller, described below, in the housing 22 for determining level in the vessel V. The probe 24 may comprise any one of a single rod probe, a coaxial probe or a twin rod probe, as is well known.

The vessel V contains a material M and has vapor or air A above a liquid surface L. As described more particularly below, the controller in the housing 22 generates and transmits pulses TP on the probe. A reflected signal RP is developed off any impedance changes, such as the liquid surface L of the material M being measured. A small amount of energy, E, may continue down the probe 24.

Guided wave radar combines TDR, ETS and low power circuitry. TDR uses pulses of electromagnetic (EM) energy to measure distanced or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. Then the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second.

Figure 2:
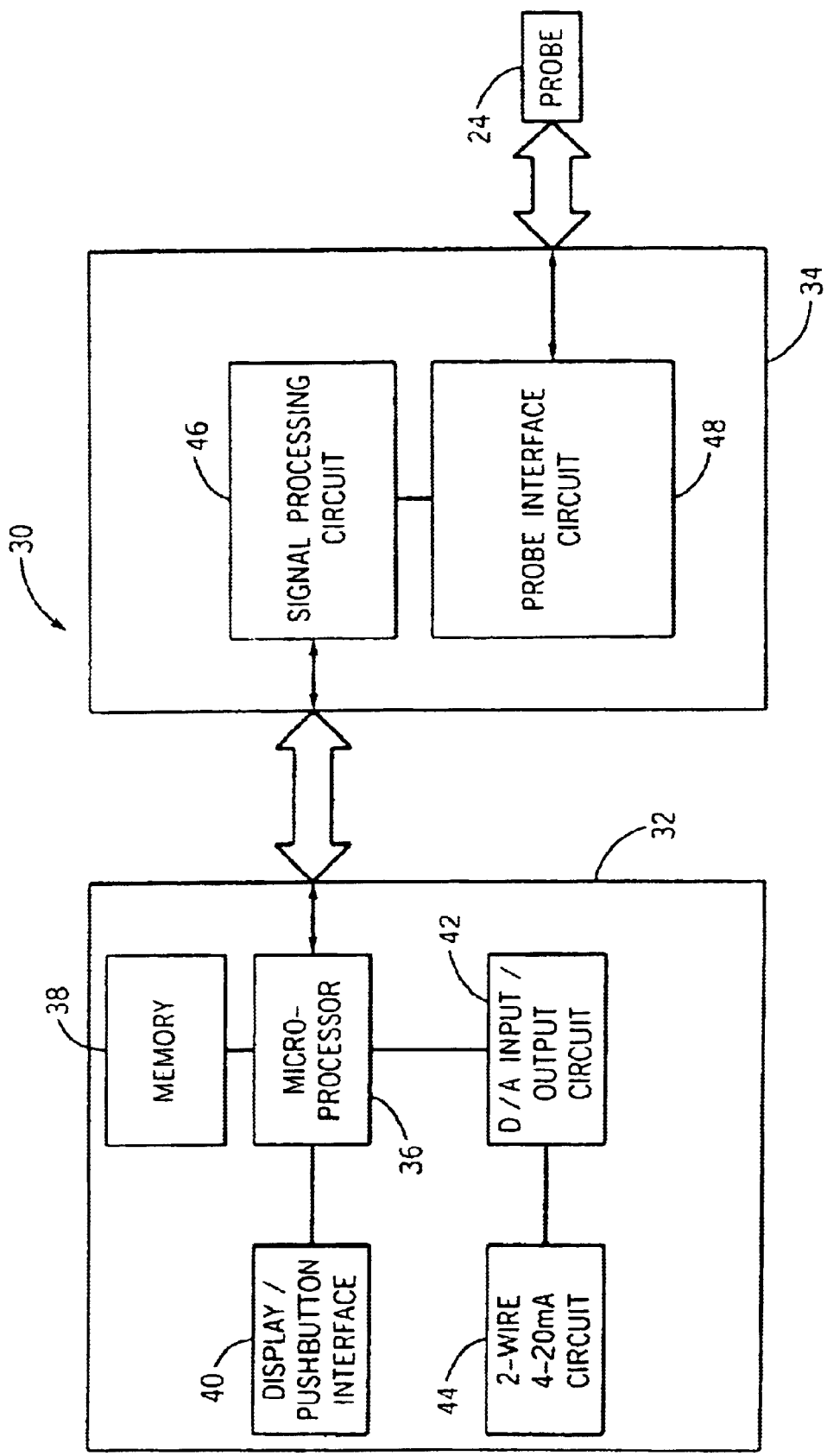
FIG. 2 is a block diagram of a control circuit for the instrument of FIG. 1.

Referring to FIG. 2, the electronics mounted in the housing 22 of FIG. 1 are illustrated in block diagram form as a controller in the form of a control circuit 30 connected to the probe 24. The control circuit 30 includes a digital circuit board 32 and an analog circuit board 34. The digital circuit board 32 includes a microprocessor 36 connected to a suitable memory 38 (the combination forming a computer) and a display/push button interface 40. The display/push button interface 40 is used for entering parameters with a keypad and displaying user information. The memory 38 comprises both non-volatile memory for storing programs and calibration parameters, as well as volatile memory used during level measurement. The microprocessor 36 is also connected to a digital to analog input/output circuit 42 which is in turn connected to a two-wire 4–20 mA circuit 44 for connecting to remote devices. Particularly, the two-wire circuit 44 utilizes loop control and power circuitry which is well known and commonly used in process instrumentation. The power is provided on the line from an external power supply. The circuit 44 controls the current on the two-wire line which represents level or other characteristics measured by the probe 24.

The control circuit 30 has the capability of implementing digital communications through the two-wire circuit 44 with remote devices and the outside world. Such communication preferably uses the HART protocol, but could also use fieldbus protocols such as Foundation Fieldbus or Profibus PA.

The microprocessor 36 is also connected to a signal processing circuit 46 on the analog board 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 44 processes the ETS signals and provides a time output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances.

In accordance with the invention, the known ETS circuitry is modified to provide enhanced operation, as described below.

Figure 3:
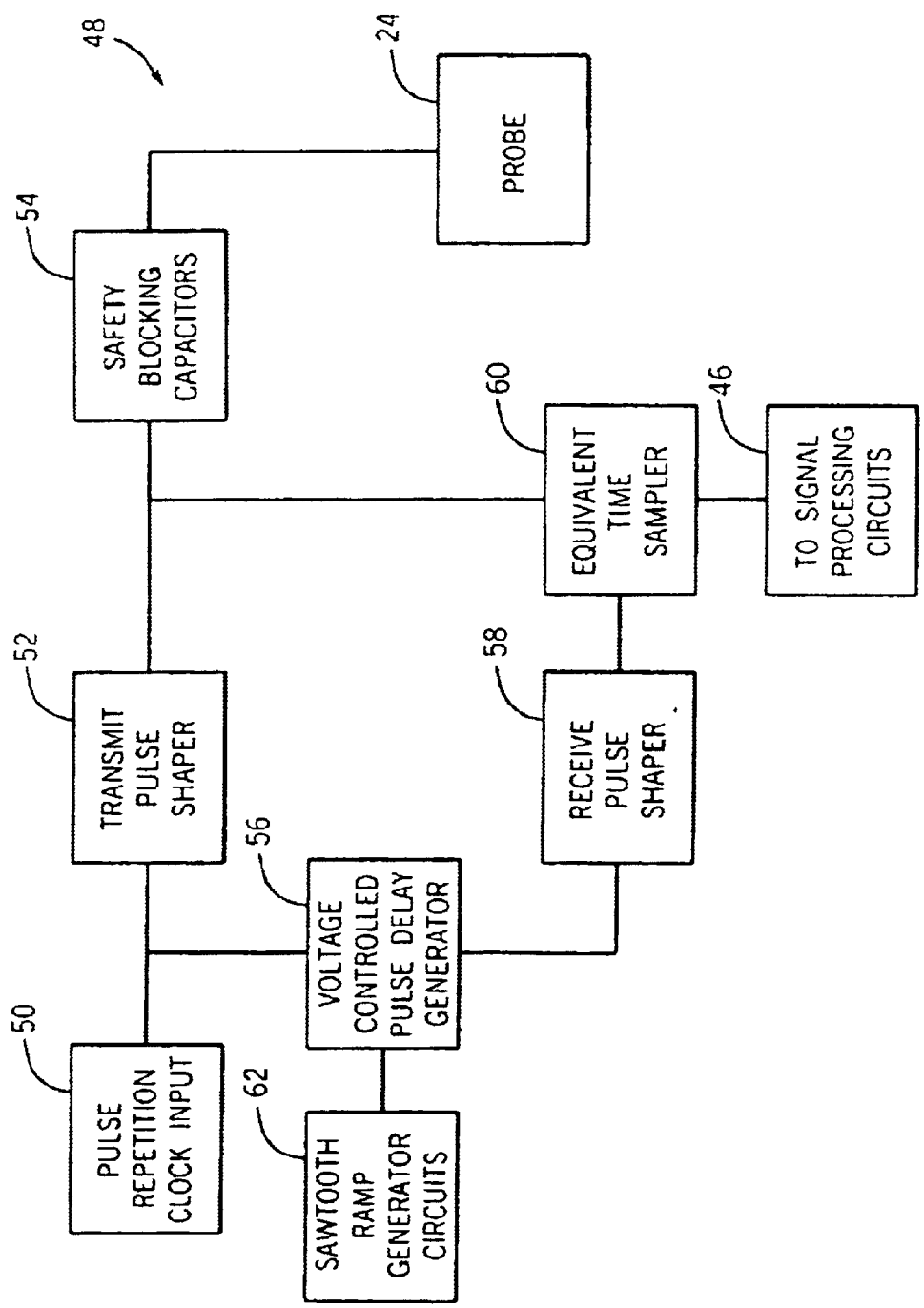
FIG. 3 is a block diagram of the probe interface circuit for the control circuit of FIG. 2.

Referring to FIG. 3, a block diagram illustrates the probe interface circuit 48 in greater detail. A pulse repetition clock input 50 is connected to a transmit pulse shaper 52 which is in turn connected via a safety blocking capacitor circuit 54 to the probe 24. The clock input 50 is also connected to a pulse input of a voltage controlled pulse delay generator 56. The output of the delay generator 56 is connected to a receive pulse shaper 58 that is connected to an equivalent time sampler 60. The sampler 60 is connected via the safety blocking capacitor circuit 54 to the probe 24. An output of the sampler 60 is connected to the signal processing circuit 46. A saw tooth ramp generator circuit 62 develops a saw tooth ramp as an input to the voltage controlled pulse delay generator 56.

The clock input 50 generates a pulse train at the frequency of the transmitted pulses. For each input pulse, the pulse delay generator 56 generates an output pulse with a delay that is controlled by its control voltage input received from the saw tooth ramp generator circuit 62. The delayed pulse passes through the receive pulse shaper 58 and is provided to the sampler 60. The sampler 60 samples the reflected pulses from the probe 24 at a time determined by the delayed and shaped output pulse. The resulting low frequency sampled signal is amplified and passed on to the signal processing circuit 46.

Figure 4:
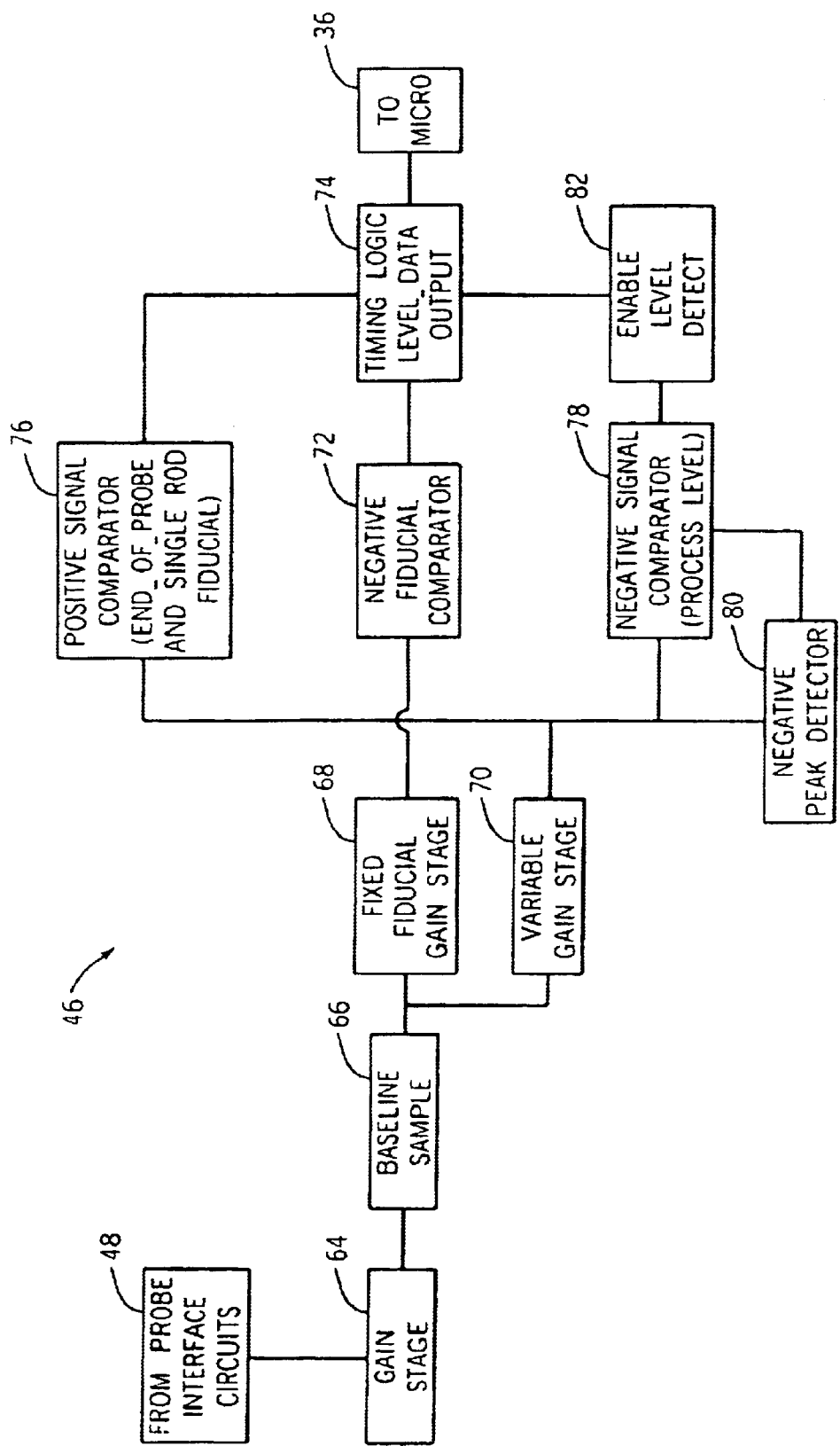
FIG. 4 is a block diagram of the signal processing circuit for the control circuit of FIG. 2.

Referring to FIG. 4, the signal processing circuit 46 of FIG. 2 is illustrated in greater detail. The signal from the sampler 60 is provided to a gain stage 64 which amplifies the low frequency sampled signal. The amplified signal is provided to a baseline sample circuit 66 that allows the microprocessor 36 to push the AC coupled signal back to a reference voltage. This signal can be adjusted by the microprocessor 36 to control the fiducial time and optimize performance. The output from the baseline sample circuit 66 is provided to a fixed fiducial gain stage 68 and a variable gain stage 70. The fixed fiducial gain state 68 provides a fixed gain and feeds a negative fiducial comparator circuit 72 which looks for a negative bump on the return signal, indicating the fiducial or reference marker. The indication of the fiducial is provided to a timing logic level data output circuit 74. As described above, differing signal levels result from differing dielectric constants of the reflecting medium and from the probe characteristics. For example, the fiducial generally produces a smaller signal than does the reflecting material. As a result, the fixed fiducial gain stage 68 generally uses a higher gain than does the variable gain stage. The variable gain stage 70 allows for variable gain selection according to the particular material being sensed. The output of the variable gain stage 70 is provided to a positive signal comparator 76 and a negative signal comparator 78. The positive signal comparator is used for sensing an end of probe signal and the fiducial for a single rod probe. Its output is also supplied to the timing logic level data output circuit 74. The variable gain stage 70 is also connected to a negative peak detector circuit 80 which is connected to the negative signal comparator 78. The negative peak detector circuit 80 is a proportional threshold comparator circuit that develops a threshold as a proportion of the peak signal level. This threshold is provided to the negative signal comparator 78 which determines presence of the process level pulse. The negative signal comparator 78 is provided via an enable level detect circuit 82 to the timing logic level data output 74. The enable level detect circuit 82 adjusts a deadzone time based on user input and a microprocessor timing output.

Figure 5:
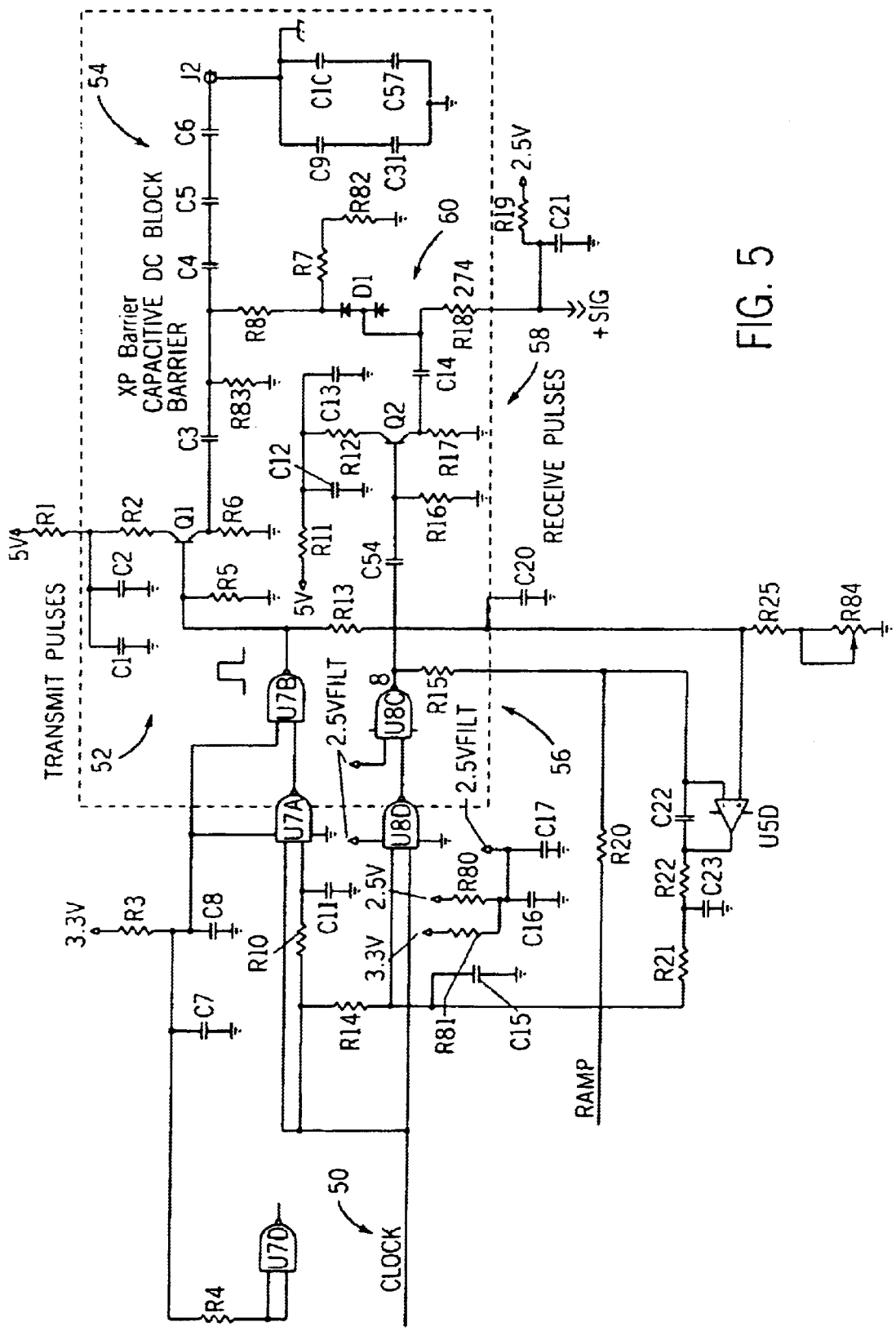
FIGS. 5 and 6 are a schematic diagram of the probe interface circuit of FIG. 3.

With reference to FIG. 5, an electrical schematic illustrates a portion of the probe interface circuit of FIG. 3. The overall operation of the electrical schematic of FIG. 5, and likewise FIGS. 6 and 7, will be apparent to those skilled in the art. Only those components necessary for an understanding of the improvements are described in detail.

The clock input 50 is supplied to the transmit pulse shaper 52 comprising a NAND gate U7A having its output connected to another NAND gate U7B. An output of the second NAND gate U7B drives a transistor Q1. The transistor Q1 is connected to the safety barrier circuit 54. When the measurement instrument 20 is applied as an explosion proof unit, it must have a suitable housing, rated as explosion proof, but also must limit energy that enters the process via the probe 24 to intrinsically safe levels. Three high voltage capacitors, C4, C5 and C6 are connected in series between a probe connection J2 and via a capacitor C3 to the transistor Q1. The safety barrier assures that no unsafe voltage or current enters the probe. Each part must be capable of withstanding a fault voltage. The value of the capacitors C4–C6 must be chosen to assure that the circuit will not allow fault currents beyond a safe level, at any possible fault frequency. The capacitors C4–C6 may be on the order of 1000 pF.

In the illustrated embodiment of the invention, the measurement instrument 20 comprises a guided wave radar instrument. As will be apparent to those skilled in the art, the safety barrier circuit 54 may be used in connection with a measurement instrument in which the probe 24 comprises a capacitance probe and, as such, the probe 24 of FIG. 1 is likewise illustrative of a capacitance probe.

Figure 6:
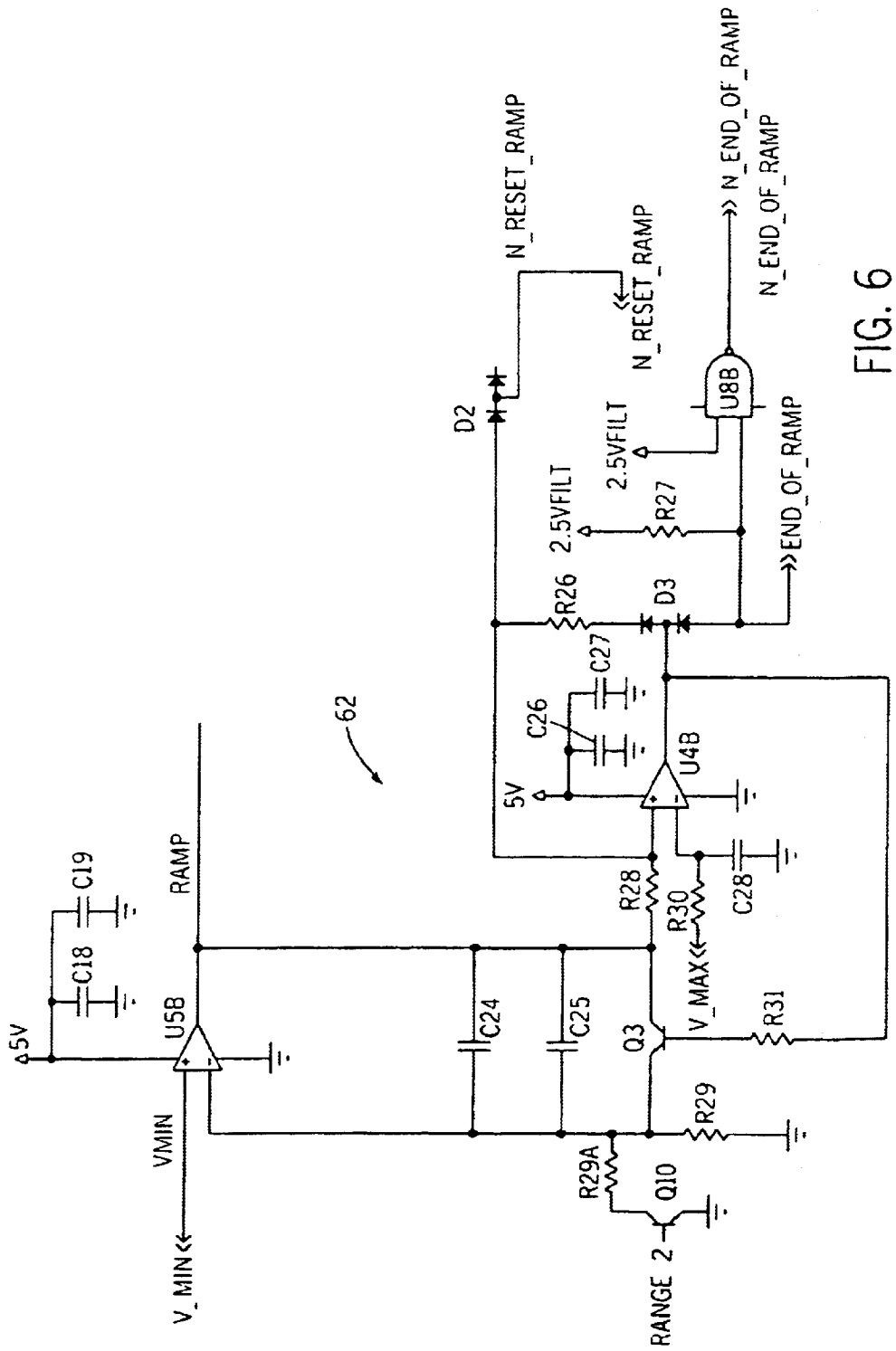

With reference also to FIG. 6, the saw tooth ramp generator circuit 62 is provided with controlled start and retrace after an end of the ramp. An end of ramp comparator resets the ramp output to a starting voltage and latches itself. The microprocessor 36 must start the ramp by sending a control signal that clears the latch. As such, the microprocessor 36 controls the ramp which freeruns to its end. The ramp stays at a start voltage until started by the microprocessor 36 so control is smoother at the start of a cycle. Range selection is also provided, as described below.

An operational amplifier U5B operates as a ramp generator. Capacitors C24 and C25 are connected between an output of the Op-Amp U5B and its inverted input. The non-inverted input is connected to receive a select voltage reference VMIN. A resistor R29 is connected between the inverted input and ground. A second resistor R29A is connected between the inverted input and a transistor Q10. The capacitors C24 and C25 are charged by the current established by VMIN and the resistance of the resistor R29. The output of the Op-Amp U5B is connected via a resistor R28 to the non-inverted input of a comparator U4B. The inverted input of the comparator U4B is connected to a signal VMAX representing the upper voltage of the ramp. When the ramp voltage output of the Op-Amp U5B reaches the voltage VMAX the comparator U4B trips high turning on a transistor Q3 connected across the Op-Amp U5B and resets the RAMP voltage to VMIN.

The output of the comparator U4B is coupled by a diode D3 and resistor R26 to the non-inverted input of the comparator U4B. This holds the comparator output high until reset by a low voltage at a diode D2 connected to the non-inverted input of the comparator U4B. The opposite side of the diode is connected to an N_RESET_RAMP. The N_RESET_RAMP signal is provided from the microprocessor 36. This allows the microprocessor 36 to start the ramp. The diode D3 is also connected to an END_OF_RAMP input to the microprocessor 36. This circuit gives control of the ramp starting and allows the microprocessor 36 to monitor the length of the ramp.

The transistor Q10 is controlled by a Range2 input from the microprocessor 36 to change the slope of the ramp by selectively placing an additional resistor R729A in parallel with the resistor R29. A faster slope allows the ramp to scan the same length of probe in less time. This in combination with the selection of the voltage VMAX allows the selection of probe lengths to be scanned in a fixed period of time. The instrument 20 has a fixed repetition rate of the number of measurements per second.

Referring again to FIG. 5, the clock input 50 is also provided to a NAND gate U8D having its output connected to another NAND gate U8C which drives a transistor Q2. The ramp signal is connected via resistors R20 and R15 to the output of the NAND gate U8C. The NAND gates U8D and U8C operate as a time delay gate. The ramp signal works against the pulse width timing of the output gate. Particularly, as the ramp voltage increases additional delay is provided. The delayed pulse drives the transistor Q2 which turns on a diode D1. The voltage from returned pulses from the probe connection J2 are provided via the safety barrier circuit 54 to a capacitor C14 connected between the transistor Q2 and the diode D1. A resistor R18 is connected between the junction of the capacitor C4 and the diode D1 and provides a signal labeled +SIG to the signal processing circuit of FIG. 4.

Figure 7:
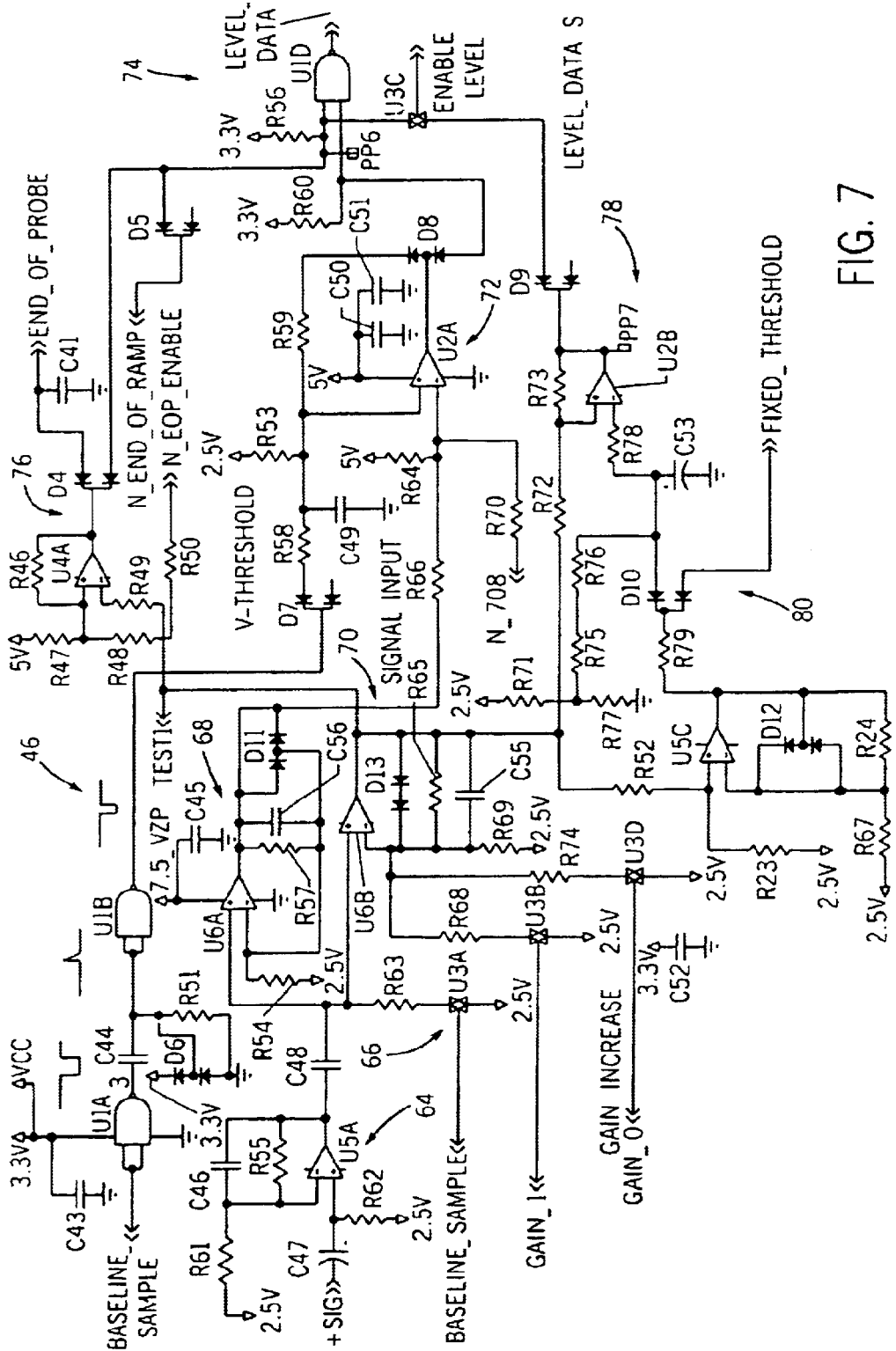
FIG. 7 is a schematic diagram of the signal processing circuit of FIG. 4.

Referring to FIG. 7, an electrical schematic illustrates the signal processing circuit 46 of FIG. 4. The signal line +SIG is connected to the gain stage 64 comprising an Op-Amp U5A. A baseline sample input from the microprocessor 36 controls an analog switch U3A connected between a reference voltage and an output of the Op-Amp U5A. This provides a DC reference by forcing the signal to the 2.5 volt reference in the illustrated embodiment.

In a guided wave radar unit a fiducial signal, which is a small signal reflected in the top of a probe, establishes the reference time for the level signals that are received from the process material. The fiducial is typically very small compared to the level signal and must be detected accurately to assure proper level measurements. In accordance with the invention, a latching comparator U2A detects the fiducial signal. The baseline sample control signal from the microprocessor 36 is also provided to a NAND gate U1A which is in turn connected to a NAND gate U1B and then through a diode D7 to the non-inverted input of the latching comparator U2A. A capacitor C49 is connected between the non-inverted input and ground. The microprocessor 36 uses this circuit to reset the voltage on the capacitor C49 to the reference voltage. This causes the output of the latching comparator U2A to go low arming it for the next fiducial.

The signal input is provided from the amplifier U5A to the non-inverted input of an Op-Amp U6A. The inverted input is connected via a resistor R54 to the reference voltage. When the signal from the Op-Amp U6A pulls below the reference by sufficient amount the output of the latching comparator U2A goes high. A diode D8 couples the high output back to the non-inverted input of the latching comparator U2A. This latches the comparator high until the next cycle. The microprocessor 36 controls the next cycle by control of the reset signal, described above, which resets the voltage on the capacitor C49.

The output from the comparator U2A is also connected via the diode D8 to one input of a NAND gate U1D which provides the timing logic level data output LEVEL.

The signal processing circuit 46 uses fixed or proportional threshold detection. The proportional threshold detection adjusts the threshold of the sensor to a constant proportion of the peak amplitude of the pulse echoed from the material surface.

A comparator U2B operates as a proportional threshold comparator. Its inverted input is connected via a series resistor R78 and capacitor C53 to ground. The junction between the resistor R78 and the capacitor C53 is connected via a diode D10 to a FIXED_THRESHOLD input from the microprocessor 36.

The signal input to the gain stage 64 is connected through an Op-Amp U6B to an Op-Amp U5C. The output of the Op-Amp U5C is connected via the diode D10 to the comparator U2B. When the fixed threshold control line is low the output of the Op-Amp U5C, which is a percentage of the negative peak detected signal, is held by the capacitor C53. This allows the comparator U2B to act as proportional threshold of the return signal. When the fixed threshold control line is high, the diode D10 cathode is held high so that resistors R71 and R77 connected between the voltage and ground establish the voltage on the capacitor C53. The comparator U2B acts as the fixed threshold detector. The output of the comparator U2B is connected via an analog switch U3C controlled by an enable level signal from the microprocessor 36, to the NAND gate U1D.

The microprocessor 36 controls the time when the level signal can be permitted to effect the proportional threshold. Holding the fixed threshold control line high does not allow the return signal on the Op-Amp U5C to couple into the capacitor C53. As a result, the microprocessor 36 can reject signals that occur after the end of the probe is detected. After the end of the probe is detected, only signal anomalies occur. These can be larger than the true level signal causing problems where the comparator U2B cannot detect the actual level.

Known guided wave radar transmitters can use single rod probes, coaxial probes, and twin rod probes. Such known devices typically require different circuitry depending on the type of probe. This is because coaxial or twin rod probes have a negative fiducial and single rod probes have a positive fiducial because of the increased impedance at the top of the probe. In accordance with the invention, the measurement instrument 20 uses one logic circuit for any probe type.

Two control lines are used by the microprocessor 36 to select the probe type. The line N708 controls the signals to the negative fiducial comparator U2A by being connected to its inverted input. When the signal N708 is tri-stated (high impedance), the signals from the amplifier U6A are allowed to pass to the negative fiducial comparator U2A. This is the condition used for coaxial and twin rod probe types. A comparator U4A comprises a positive signal comparator. A line N_EOP_Enable control signal from the microprocessor 36 is connected to the non-inverted input of the comparator U4A. The signal line is received from the Op-Amp U6B to the inverted input of the comparator U4A. When the signal on the line N_EOP_Enable is low the comparator U4A detects positive signals, as can occur from the top of the signal rod probe or from the end of the probe. The output of the comparator U4A is connected via a diode D4 to the NAND gate U1D of the timing logic level data output circuit 74.

With coaxial or twin rod probe selection, the control N708 is tri-stated at all times. The line N_EOP_Enable is pulled low after some blanking time to account for the positive signal from the twin rod top of probe impedance transition. The comparator U4A is enabled to detect the end of probe signal.

In the single rod mode, the control line N708 is always held low to disable the comparator U2A. The control line N_EOP_Enable is pulled low before the top of the probe so that the positive fiducial signal can be detected.

Probe selection also involves significant complexity in the microprocessor 36. The fiducial timing for negative fiducial probes is from the falling edge of the first pulse in the LEVEL data line from the NAND gate U1D. On a single rod probe, the leading edge of the first pulse in the level data line is used for the fiducial time.

Gain selection for the measurement instrument 20 is provided via two analog switches U3B and U3D controlled by respective Gain_1 and Gain_0 control lines from the microprocessor 36. The Op-Amp U6B allows for gain control. Resistors R65 and R69 connected to the inverted input of the Op-Amp U6B establish the minimum gain when the analog switch is U3B and U3D are open. Switching on the switches U3B and U3D individually or together allows three additional steps of gain. Particularly, a resistor R68 is connected by the first switch U3B between the inverted input of the Op-Amp U6B and the reference voltage. A resistor R74 is connected by the analog switch U3D between the reference voltage and the inverted input. Thus, the resistors R74 and R68 determine the actual gain steps as parallel resistance with the resistor R69. As is apparent, N switches and resistor could be used to allow for $2^N$ gain steps.

Figure 8:
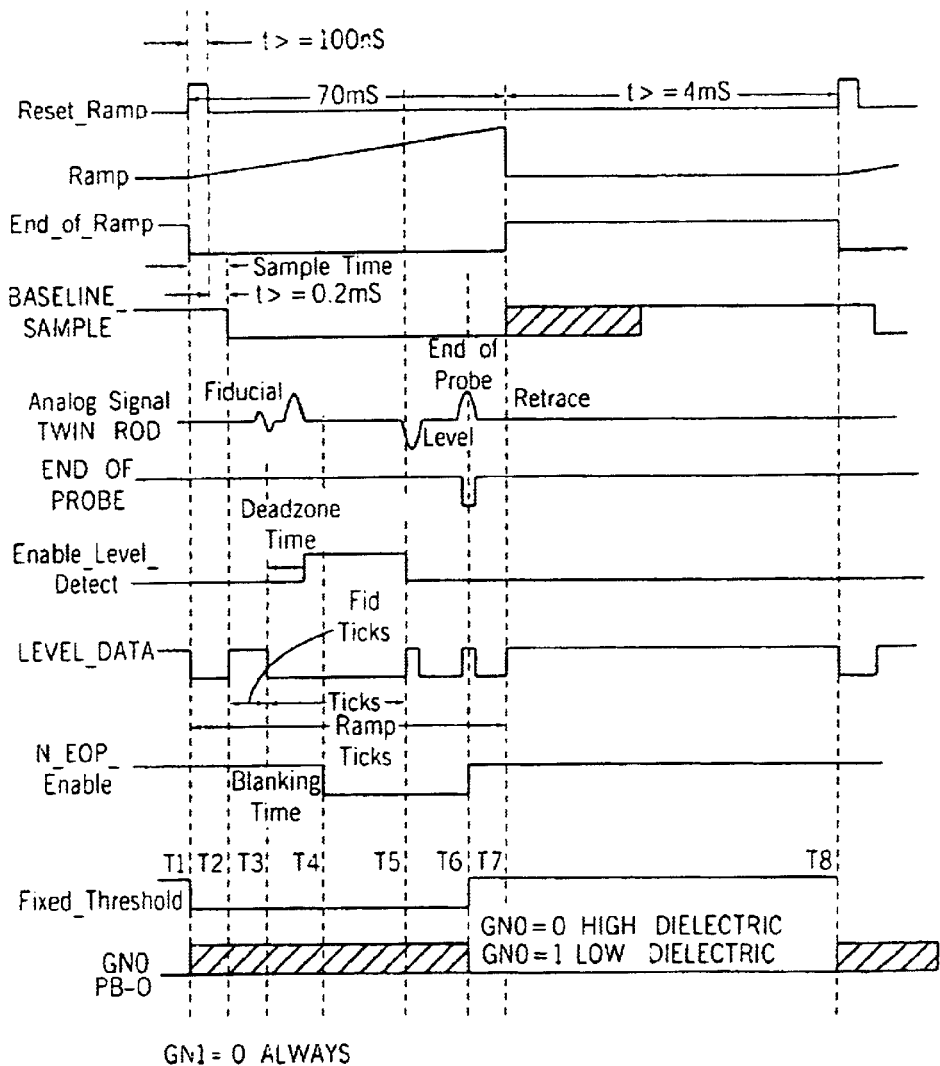
FIG. 8 is a timing diagram illustrating operation of the control circuit in accordance with the invention used with a coaxial or twin rod probe.
Figure 9:
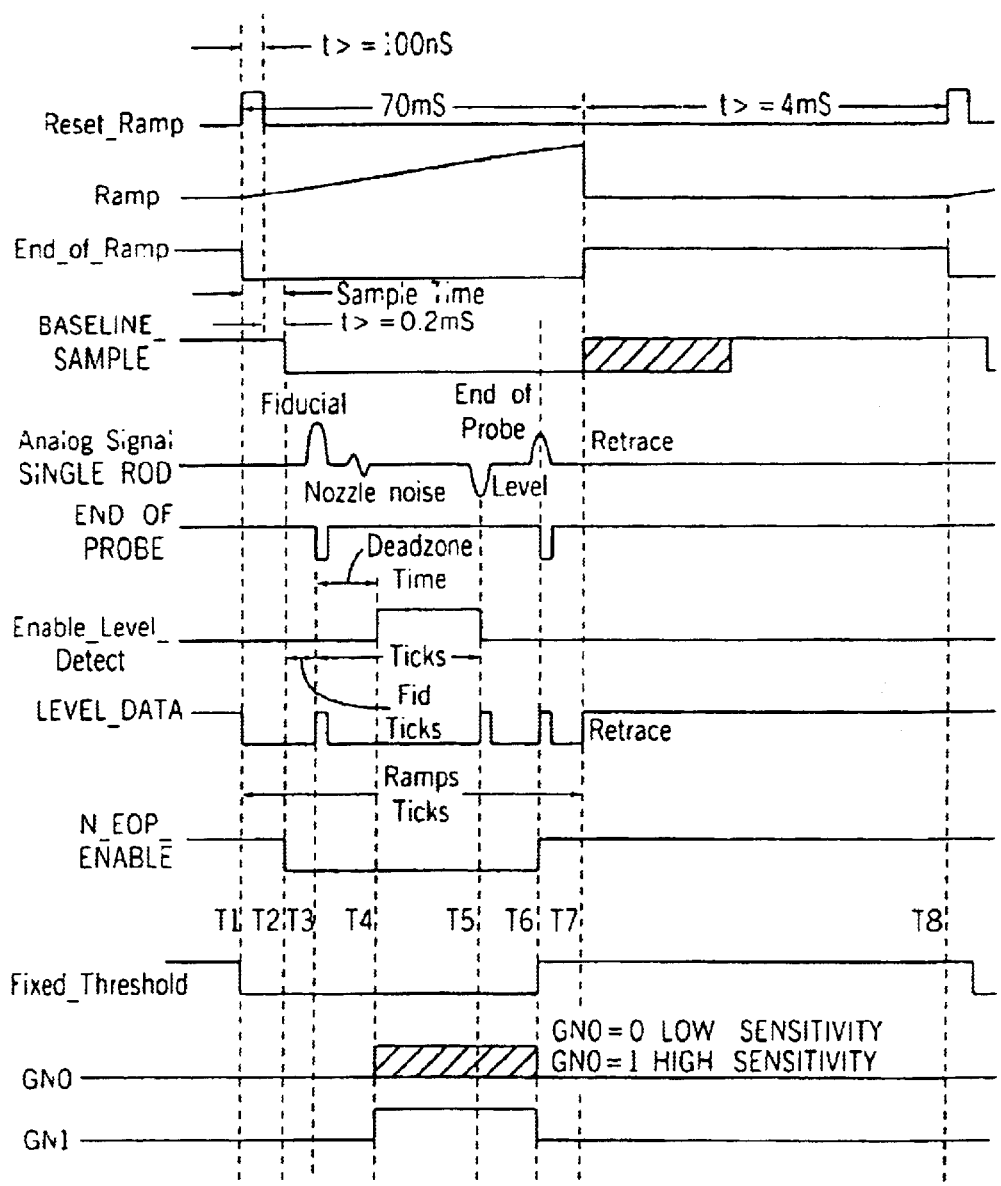
FIG. 9 is a timing diagram illustrating operation of the control circuit in accordance with the invention used with a single rod probe.

FIGS. 8 and 9 illustrate timing diagrams for operation of the level measurement instrument 20 in accordance with the invention. Particularly, FIG. 8 illustrates operation with a coax or twin rod probe, while FIG. 9 illustrates operation with a single rod probe. The signals are labeled in bold lettering for microprocessor outputs and in italics for microprocessor inputs.

Referring initially to FIG. 8, the cycle begins when the reset ramp control signal from the microprocessor 36 goes high at time T1. This corresponds to an inverted N_RESET_RAMP control signal going low causing the cycle to begin and the ramp signal to start for a particular cycle. The baseline sample control line enables sensing by resetting comparators pushing them back to the 2.5 volt reference, as discussed above. Once sensing is enabled, then a fid ticks counter is enabled at a time T2 to count the amount of time to receipt of the reflected fiducial pulse, as illustrated. The level data input is high prior to sensing the fiducial pulse. A ramp ticks counter begins counting at the initiation of the ramp. A ticks counter begins counting at the completion of the fiducial. The enable level detect control signal utilizes a deadzone time after the fiducial during which any reflected signals are ignored. This is a user adjustable time. During the deadzone time, the ticks counter continues until the reflected level pulse is received at a time T5. The END_OF_PROBE signal is received at a time T6. The ramp reaches the voltage VMAX at a time T7 and retraces to the VMIN value where it remains until the completion of the cycle at a time T8 when the next RESET_RAMP signal is sent from the microprocessor 36. In the illustrative example, the fixed threshold output is set low between the times T1 and T6 to operate in the proportional threshold mode.

As is apparent from FIG. 8, the analog signal, shown for twin rod operation, comprises the time multiplied fixture of the reflected pulses. The level data signal shows the pulses developed by the signal processing circuit 46 supplied to the microprocessor 36 for determining level. Particularly, the microprocessor 36 computes level by determining the ratio of the values ticks to ramp ticks resulting in a relative distance. This is then used for computing level.

The timing diagram of FIG. 9 differs with respect to the use of the first end of probe input to the microprocessor as the fiducial which is enabled after the baseline sample control signal.

Thus, in accordance with the invention, there is provided a guided wave radar measurement instrument of reduced complexity and cost while providing accurate and precise level measurement.

The present invention has been described with respect to timing diagrams and block diagrams. It will be understood that output signals of the timing diagrams and various blocks of the block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

I claim:

1. A guided wave radar transmitter comprising:
   a probe defining a transmission line and including a reference marker proximate a top end of the probe, the probe comprising one of a single rod probe, a coaxial probe or a twin rod probe;
   a pulse circuit connected to the probe for generating pulses on the transmission line and receiving a reflected signal from the transmission line, the reflected signal selectively including a fiducial pulse representing the reference marker, the fiducial pulse being a negative pulse for a coaxial probe or a twin rod probe and being a positive pulse for a single rod probe; and
   a controller operatively connected to the pulse circuit, the controller comprising a negative comparator for detecting a negative pulse and a positive comparator for detecting a positive pulse, each said comparator comparing the reflected signal to a select reference signal, and selector means for selectively operating one of the negative comparator and the positive comparator according to the type of probe being used for detecting the fiducial pulse.

2. The guided wave radar transmitter of claim 1 wherein the reflected signal selectively including a level pulse representing material along length of the probe; and the controller determining a level time between the fiducial pulse and the level pulse to determine material level, the controller comprising a latching comparator circuit for detecting the fiducial pulse and enabling level detection.

3. The guided wave radar transmitter of claim 2 further comprising a processing circuit connected to the controller for selectively resetting the latching comparator for each cycle and measuring round trip travel time for a pulse from the pulse circuit.

4. The guided wave radar transmitter of claim 2 wherein the latching comparator compares the reflected signal to a reference signal to detect the fiducial pulse.

5. The guided wave radar transmitter of claim 2 wherein the latching comparator comprises an operational amplifier having a diode connected between its output and an input to latch the comparator.

6. The guided wave radar transmitter of claim 1 wherein the reflected signal selectively including a level pulse representing material along length of the probe; and the controller including a signal comparator for comparing the reflected signal to a threshold signal, the threshold signal being selected from a fixed threshold circuit or a proportional threshold circuit.

7. The guided wave radar transmitter of claim 6 wherein the proportional threshold circuit generates a threshold value as a fraction of a peak of the reflected signal.

8. The guided wave radar transmitter of claim 6 further comprising a processing circuit connected to the controller for selectively coupling the fixed threshold circuit or a proportional threshold circuit to the signal comparator.

9. The guided wave radar transmitter of claim 1 wherein the selector means comprises a processing circuit connected to the controller.

10. The guided wave radar transmitter of claim 9 wherein the processing circuit receives an output from the negative comparator and the positive comparator and detects the fiducial pulse from a falling edge of a first pulse from the negative comparator or from a leading edge of a first pulse from the positive comparator.

11. The guided wave radar transmitter of claim 1 wherein the reflected signal selectively including pulses representing impedance changes along length of the probe; and the controller including a signal comparator receiving the reflected signal for comparing the reflected signal to a signal reference signal to detect the pulses, and a gain selection circuit for generating plural levels of gain and selector means for selectively connecting the gain selection circuit to the signal comparator to generate the signal reference signal to selectively control a reference value.

12. The guided wave radar transmitter of claim 11 wherein the gain selection circuit comprises a plurality of resistors each connected by a switch between a voltage reference and the signal comparator and the switches are operated by the selector means.

13. The guided wave radar transmitter of claim 12 wherein the gain selection circuit comprises two switches providing four stages of gain.

14. The guided wave radar transmitter of claim 12 wherein the switches comprise analog switches and further comprising a processing circuit controlling the analog switches.

15. The guided wave radar transmitter of claim 11 wherein the selector means comprises a processing circuit connected to the controller.

* * * * *